(12) United States Patent
Katori et al.

(10) Patent No.: US 10,711,716 B2
(45) Date of Patent: Jul. 14, 2020

(54) CONTROL METHOD OF INTERNAL COMBUSTION ENGINE

(71) Applicant: HONDA MOTOR CO., LTD., Tokyo (JP)

(72) Inventors: Yuto Katori, Wako (JP); Hideyuki Hayashi, Wako (JP); Daisuke Shiomi, Wako (JP); Yuichi Masukake, Wako (JP); Ryuji Yokote, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 16/121,907

(22) Filed: Sep. 5, 2018

(65) Prior Publication Data
US 2019/0072046 A1 Mar. 7, 2019

(30) Foreign Application Priority Data

Sep. 7, 2017 (JP) ................................ 2017-171636

(51) Int. Cl.
*F02D 41/00* (2006.01)
*F02D 13/06* (2006.01)
(Continued)

(52) U.S. Cl.
CPC ............ *F02D 41/0087* (2013.01); *F01L 9/02* (2013.01); *F01L 13/0005* (2013.01); *F01L 13/0015* (2013.01); *F02D 13/06* (2013.01); *F02D 37/02* (2013.01); *F02D 41/0002* (2013.01); *F01L 2013/001* (2013.01); *F01L 2800/05* (2013.01); *F02D 17/02* (2013.01); *F02D 2041/1431* (2013.01); *F02D 2250/21* (2013.01)

(58) Field of Classification Search
CPC ............... F02D 41/0087; F02D 41/307; F02D 2200/1002; F02D 2200/1006; F02D 13/06; F02D 17/02; F02D 17/023; F01L 2013/001; F01L 13/0015; F01L 13/0005
See application file for complete search history.

(56) References Cited

U.S. PATENT DOCUMENTS

2011/0239987 A1 10/2011 Maehara et al.
2016/0061118 A1* 3/2016 Hioka .................. F02D 41/0087
123/346

(Continued)

FOREIGN PATENT DOCUMENTS

JP 2000-337182 A 12/2000
JP 2011-214509 A 10/2011

*Primary Examiner* — Jacob M Amick
(74) *Attorney, Agent, or Firm* — Westerman, Hattori, Daniels & Adrian, LLP

(57) ABSTRACT

A preparation control for suppressing fluctuation of an output torque of the engine at the time of executing switching operation from the whole cylinder operation to the partial cylinder operation is executed when having made a switching request from the whole cylinder operation to the partial cylinder operation. The target switching time executing the switching operation is calculated in accordance with the valve operation phase after the preparation time is completed. The cylinder deactivation mechanism is controlled such that the switching operation is executed at the target switching time. The target switching time is set in accordance with the valve operation phase at the timing in which the abnormal noises are not generated.

10 Claims, 10 Drawing Sheets

(51) Int. Cl.
*F01L 13/00* (2006.01)
*F02D 37/02* (2006.01)
*F01L 9/02* (2006.01)
F02D 17/02 (2006.01)
F02D 41/14 (2006.01)

(56) References Cited

U.S. PATENT DOCUMENTS

2016/0146120 A1\* 5/2016 Kawaguchi ............. F01L 1/267
123/559.2
2018/0313281 A1\* 11/2018 Nakano ............... F02D 41/0087

\* cited by examiner

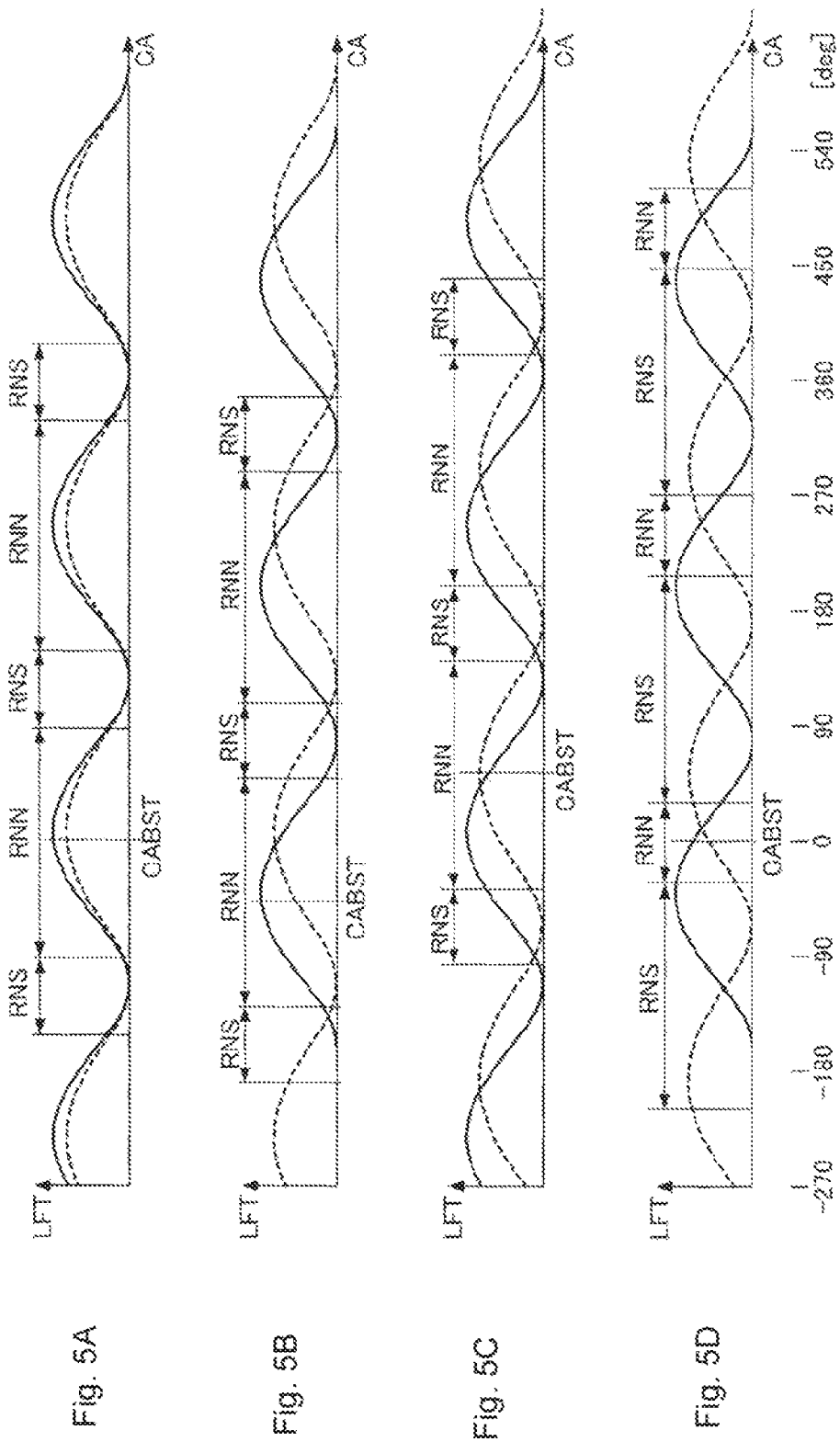

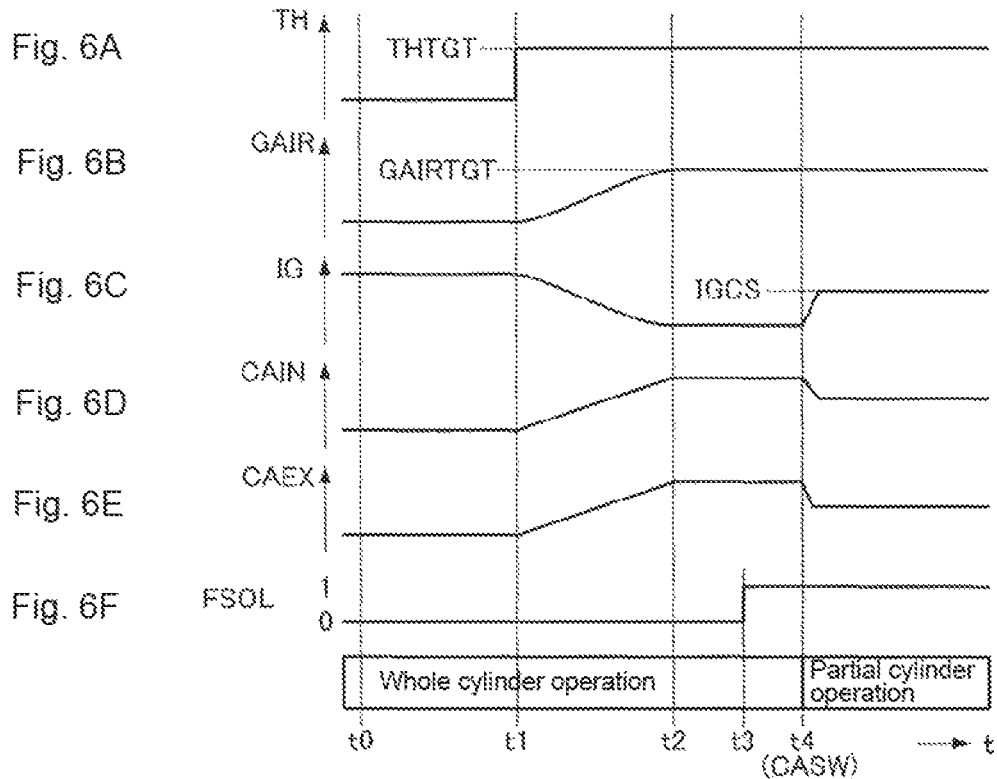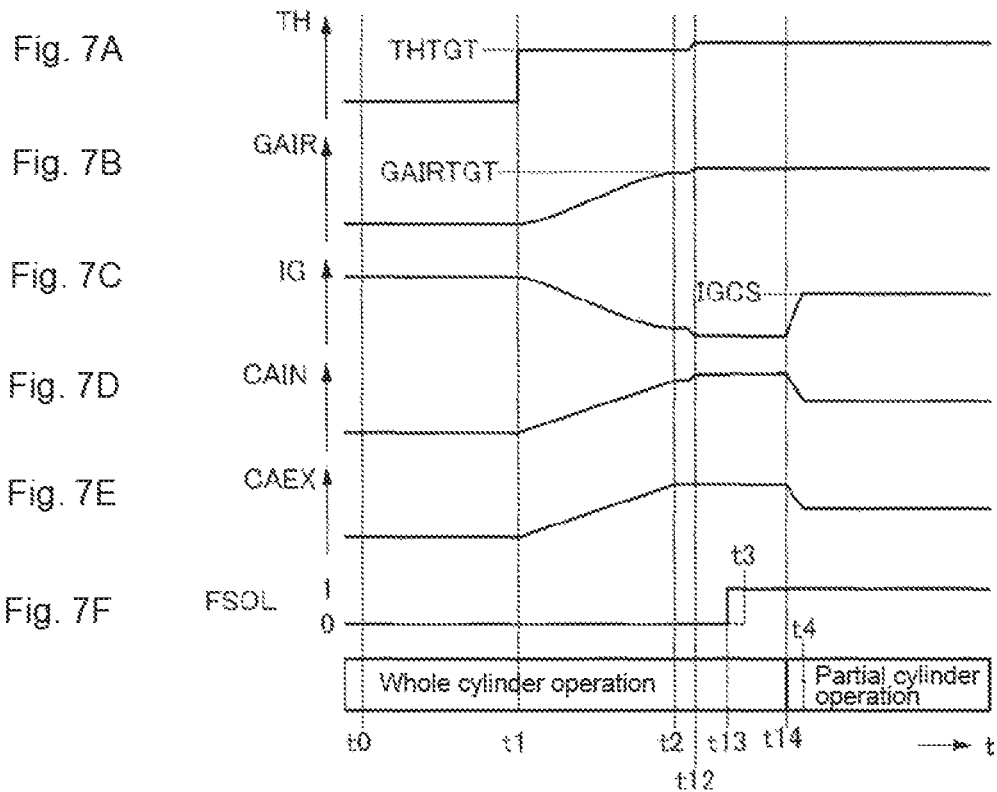

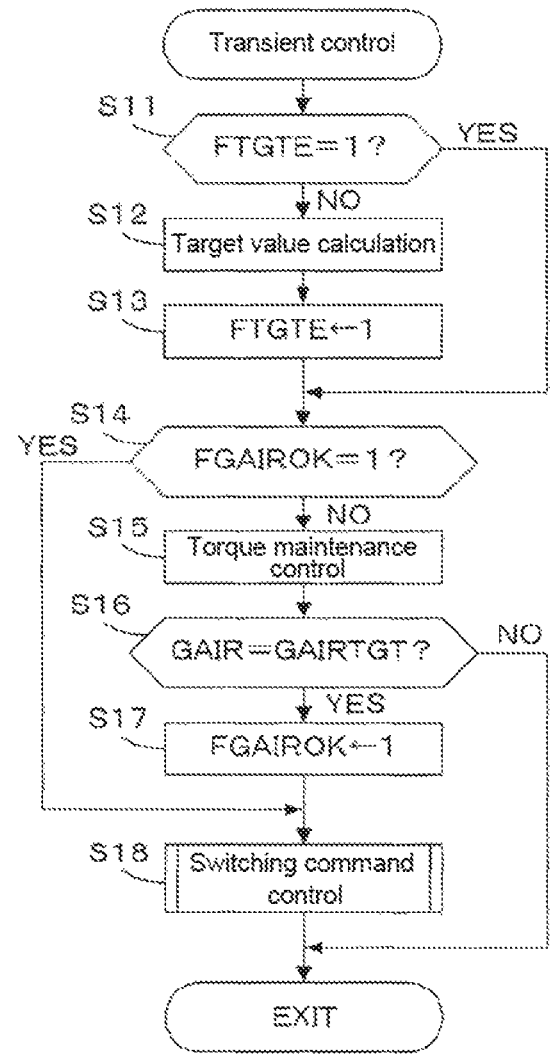

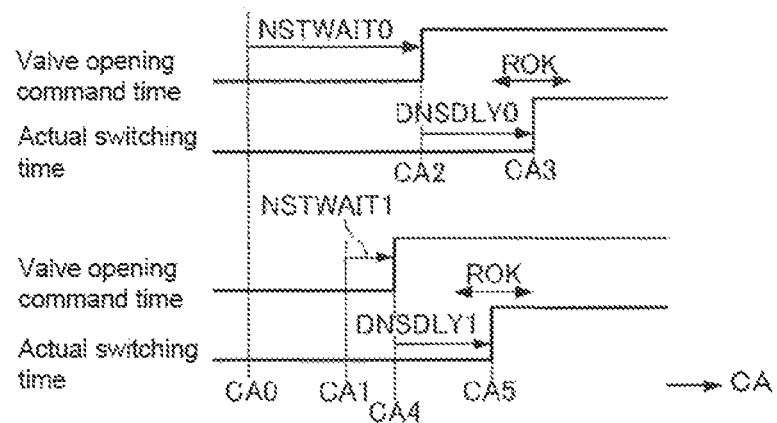
Fig. 12A
Fig. 12B
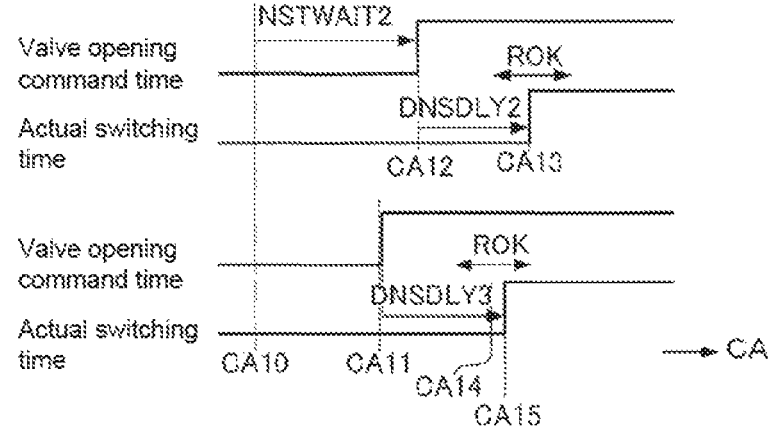
Fig. 13A
Fig. 13B

CONTROL METHOD OF INTERNAL COMBUSTION ENGINE

CROSS REFERENCES TO RELATED APPLICATIONS

The present application claims priority under 35 U.S.C. § 119 to Japanese Patent Application No. 2017-171636, filed Sep. 7, 2017, entitled "CONTROL METHOD OF INTERNAL COMBUSTION ENGINE." The contents of this application are incorporated herein by reference in their entirety.

TECHNICAL FIELD

The present disclosure relates to a control method of an internal combustion engine provided with plural cylinders, and more particularly, to the control method of the internal combustion engine provided with a cylinder deactivation mechanism performing switching between partial cylinder operation in which a part of plural cylinders is operated and whole cylinder operation in which all of the cylinders are operated, and a valve operation phase variable mechanism for changing an operation phase of an intake valve and/or exhaust valve which are provided with each of the cylinders.

BACKGROUND

In Japanese Patent application Laid-Open Publication No. 2000-337182, there is shown a control device of an internal combustion engine which is provided with the above mentioned cylinder deactivation mechanism and valve operation phase variable mechanism for changing an operation phase of an intake valve. According to this control device, transient control for gradually changing from the valve operation phase for the whole cylinder operation to the valve operation phase for the partial cylinder operation is executed at the time of being shifted from the whole cylinder operation to the partial cylinder operation. According to this transient control, it is set that a transition speed of the valve operation phase decreases as a difference between an engine output torque at the time of operating the whole cylinders and the engine output torque at the time of operating the part of cylinders increases.

SUMMARY

Since there may be cases where abnormal noises are generated attributable to timing executing a switching operation depending upon a configuration of the cylinder deactivation mechanism, the timing executing the switching operation from the whole cylinder operation to the partial cylinder operation is necessary to be determined taking a operation condition (valve operation phase) of a valve operation condition variable mechanism into consideration. The control device of the Japanese Patent application Laid-Open Publication No. 2000-337182 is a device characterizing the control method of an intake valve operation phase after having executed switching from the whole cylinder operation to the partial cylinder operation, and does not take suppression of the abnormal noises in accordance with the switching operation into consideration.

It is desirable to provide a control method capable of accurately executing transient control at the time of being shifted from whole cylinder operation to partial cylinder operation and capable of preventing generation of abnormal noises at the time of executing switching operation from whole cylinder operation to the partial cylinder operation in an internal combustion engine provided with a cylinder deactivation mechanism and a valve operation phase variable mechanism for changing an operation phase of an intake valve and/or exhaust valve.

According to first aspect of embodiments, a control method of an internal combustion engine which comprises a plurality of cylinders, a valve operation phase variable mechanism for changing a valve operation phase of at least one of an intake valve and an exhaust valve provided in each of the plurality of cylinders, and a cylinder deactivation mechanism for performing switching between partial cylinder operation in which a part of the plural cylinders is operated and whole cylinder operation in which all of the cylinders are operated, characterized in that the method comprises a step a for executing a preparation control for suppressing fluctuation of an output torque of the engine at the time of executing switching operation from the whole cylinder operation to the partial cylinder operation when having made a switching request from the whole cylinder operation to the partial cylinder operation, a step b for operating target switching time (NSTBST) executing the switching operation after the preparation control is completed in accordance with the valve operation phase (CAIN, CAEX), and a step c for outputting switching command signal to the cylinder deactivation mechanism based on the target switching time (NSTBST).

With this configuration, the preparation control for suppressing the fluctuation of the engine output torque at the time of executing the switching operation from the whole cylinder operation to the partial cylinder operation is executed when having made the switching request from the whole cylinder operation to the partial cylinder operation, the target switching time for executing the switching operation is operated after the preparation control is completed in accordance with the valve operation phase, and the switching command signal is outputted to the cylinder deactivation mechanism based on the operated target switching time. It is confirmed that timing at which the abnormal noises are not generated changes depending upon the valve operation phase, in case where the abnormal noises are generated depending upon the timing executing the switching operation. Accordingly, the target switching time is calculated in such a manner that the timing (optimum switching time) at which the abnormal noises are not generated is created, in accordance with the valve operation phase, and the switching command signal is outputted based on the target switching time, so that the generation of the abnormal noises can be prevented.

According to second aspect, in the step c, a command signal output time (NSTWAIT: NSTBST-DNSDLY) being an output time of the switching command signal is operated in accordance with a operation delay time (DNSDLY) of the cylinder deactivation mechanism in such a manner that the switching operation is executed at the target switching time (NSTBST).

According to this configuration, since the command signal output time is operated in accordance with the operation delay time of the cylinder deactivation mechanism in such a manner that the switching operation is executed at the target switching time, timing at which an actual switching operation is executed is allowed to coincide accurately with the target switching time, so that the generation of abnormal noises can be accurately prevented.

According to third aspect, the control method of the internal combustion engine further comprising a step d for performing the recalculation of the target switching time (NSTBST) and the command signal output time (NST- WAIT), when an operation parameter (CAIN, CAEX, NE, and POIL) exerting the influence on the command signal output time (NSTWAIT) was changed before outputting the switching command signal after the calculation of the target switching time (NSTBST).

According to this configuration, since the recalculation of the target switching time and the command signal output time is performed when an operation parameter exerting the influence on the command signal output time was changed before outputting the switching command signal after calculation of the target switching time, the target switching time and command signal output time are changed in accordance with change of the operation parameter, and the generation of the abnormal noises can be prevented.

According to fourth aspect, the switching command signal is outputted immediately after performing the recalculation also in the case where there is a high possibility that the actual switching operation is not executed in the recalculated target switching time even if the switching command signal is outputted immediately after execution of the recalculation.

According to this configuration, since the switching command signal is outputted immediately after the recalculation, also in the case where there is the high possibility that the actual switching operation cannot be executed at the recalculated target switching time even if the switching command signal is outputted immediately after the recalculation, the switching operation to the partial cylinder operation can be performed in its early stages even if there is the possibility that the abnormal noises are generated, and it is possible to improve a fuel consumption.

According to fifth aspect, the cylinder deactivation mechanism (40) is provided with a switching mechanism part (43) for switching between an operation condition and a deactivation condition of the intake valve and the exhaust valve of the cylinder to be deactivated in the partial cylinder operation, and the switching operation is executed by changing hydraulic oil pressure supplied to the switching mechanism part, and wherein the command signal output time (NSTWAIT) is calculated in accordance with rotational frequency of the engine (NE) and the hydraulic oil pressure (POIL).

According to this configuration, the switching command time is determined in accordance with the hydraulic oil pressure supplied to the switching mechanism part of the cylinder deactivation mechanism and the rotational frequency of the engine. It is confirmed that the operation delay time of the cylinder deactivation mechanism changes depending upon the hydraulic oil pressure. Further, the switching command time needs to be determined by a rotation phase (crank angle) of the internal combustion engine. Therefore, the actual switching operation execution time can coincide accurately with the target switching time by determining the switching command time in accordance with the hydraulic oil pressure and the engine rotational frequency. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

FIGS. 5A-5D are each a time chart for explaining a relationship between a valve opening command time (CROP) and a crank angle range (RNS) in which the switching noises is easily generated.

FIGS. 6A-6F are each a time chart for explaining a transient control from time in which the execution condition of the partial cylinder operation was effected to time which is actually shifted to the partial cylinder operation.

FIGS. 7A-7F are each a time chart for explaining a transient control from time in which the execution condition of the partial cylinder operation is effected to time which is actually shifted to the partial cylinder operation (in the case where recalculation is performed).

FIG. 8 is a flow chart of processing for executing the transient control shown in FIGS. 6A-6F and 7A-7F.

FIGS. 12A and 12B are each a time chart for explaining the processing of FIG. 9.

FIGS. 13A and 13B are each a time chart for explaining the processing of FIG. 9.

DETAILED DESCRIPTION

Figure 1:
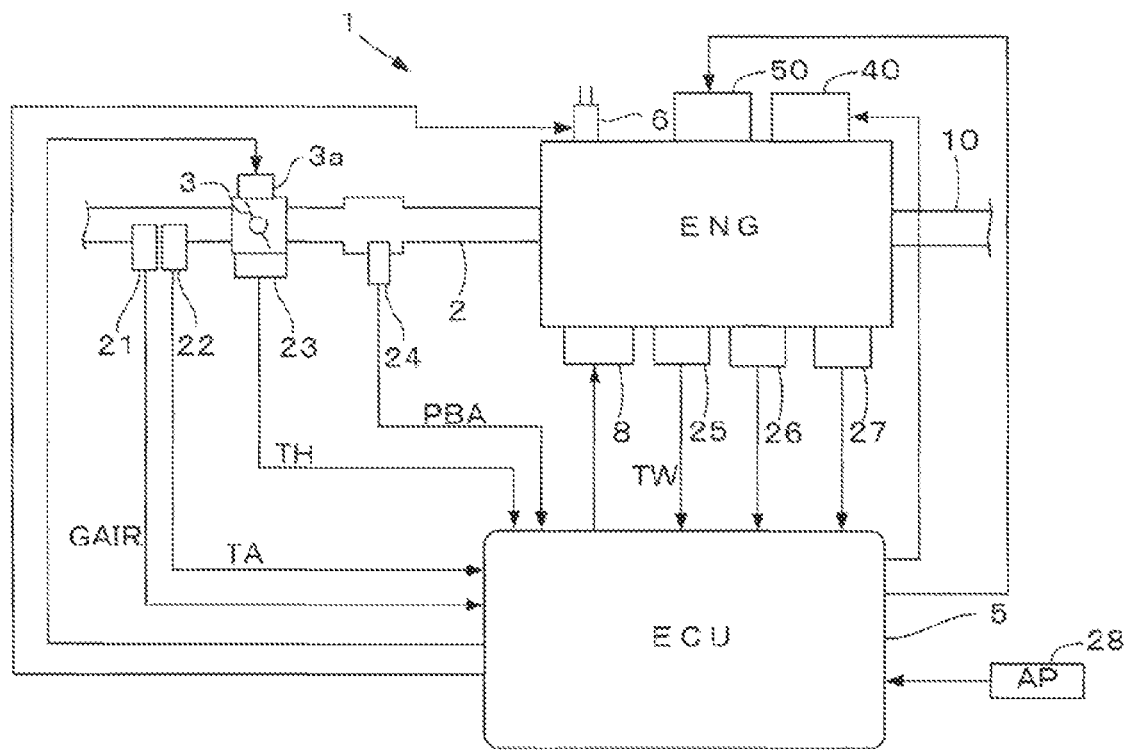
FIG. 1 is a diagram showing the configuration of an internal combustion engine and a control device thereof in accordance with an embodiment of the present disclosure.

Hereinafter, an embodiment of the present disclosure will be explained with reference to accompanying drawings. FIG. 1 is a diagram showing the configuration of an internal combustion engine and a control device thereof in accordance with an embodiment of the present disclosure. The internal combustion engine (hereinafter, referred to as "engine") 1 shown in this drawing has six cylinders, and injectors 6 for directly injecting fuel into combustion chambers are provided in each of the cylinders. The operation of the injector 6 is controlled by an electronic control unit (hereinafter, referred as "ECU") 5. Further, an ignition plug 8 is mounted on each cylinder of the engine 1. The ignition time by the ignition plug 8 is controlled by the ECU 5. A throttle valve 3 is arranged in an intake passage 2 of the engine 1.

To the ECU 5 there are connected an intake air flow rate sensor 21 for detecting an intake air flow rate GAIR of the engine 1, an intake air temperature sensor 22 for detecting an intake air temperature TA, a throttle valve opening sensor 23 for detecting a throttle valve opening TH, an intake air pressure sensor 24 for detecting an intake air pressure PBA, a cooling water temperature sensor 25 for detecting an engine cooling water temperature TW, a crank angle sensor 26 for detecting a rotation angle of a crankshaft (not shown) of the engine 1, a cam angle sensor 27 for detecting a rotation angle of a cam shaft (not shown) on which a cam for driving the intake valve and the exhaust valve of the engine 1 is mounted, an accelerator sensor 28 for detecting an operation amount AP of an accelerator pedal for a vehicle driven by the engine 1, and other sensors (not shown)(such as an air fuel ratio sensor for detecting an air fuel ratio AP, a vehicle speed sensor and the like). Detected signals of these sensors are supplied to the ECU 5. The crank angle position sensor 26 outputs a pulse signal showing a crank angle position, for example, at every 6 degrees of the crank angle, and this pulse signal is used for various kinds of timing control such as the fuel injection time, the ignition time, and the like, and the detection of the engine rotational frequency (rotation speed) NE.

The engine 1 is provided with a cylinder deactivation mechanism 40 which temporarily deactivates operation of the cylinders #1~#3, and is configured to be switchable between the partial cylinder operation in which the cylinders #4~#6 only are operated and the whole cylinder operation in which all cylinders are operated according to a driving condition of the engine 1. A publicly known technique as shown in, for example, a patent document, Japanese Patent Application Laid-Open Publication NO. 2011-214509, and its counterpart US 2011/0239987 and the like is applicable to the cylinder deactivation mechanism 40. The contents of JP 2011-214509 and US 2011/0239987 are incorporated herein by reference in their entirety. In the partial cylinder operation, a valve closed condition is maintained with respect to the intake valve and the exhaust valve of the deactivation cylinder. The ECU 5 performs the switching control between the partial cylinder operation and the whole cylinder operation. For example, the partial cylinder operation is executed in a cruise condition in which the vehicle driven by the engine 1 travels at a relatively low, almost constant vehicle speed.

Figure 2:
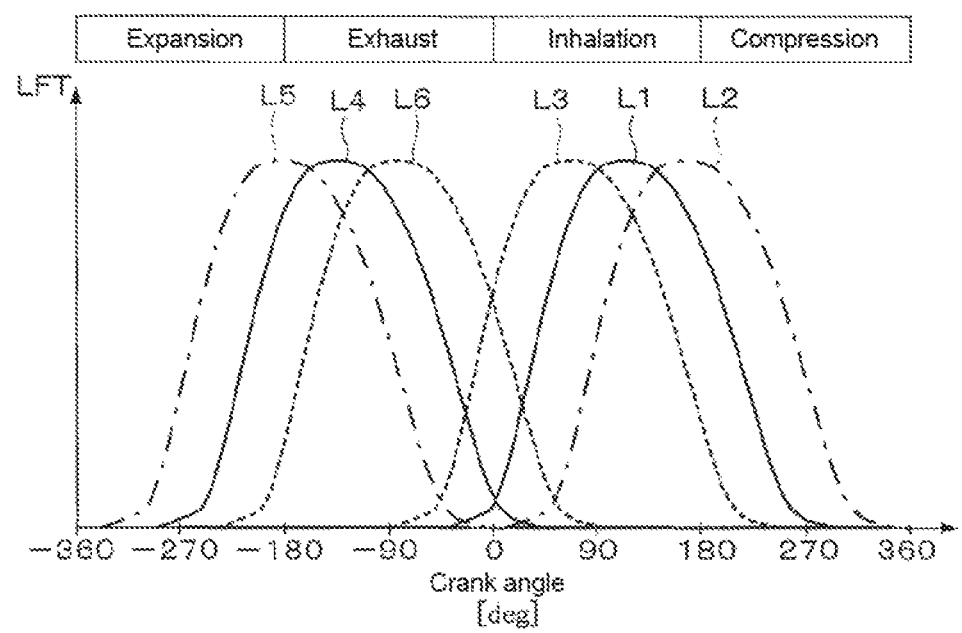
FIG. 2 is a diagram for explaining the operation with respect to a valve operation phase variable mechanism.

Further, the engine 1 is provided with a valve operation phase variable mechanism 50 which changes the operation phase with respect to the intake valve and the exhaust valve of each cylinder. The valve operation phase variable mechanism 50 has a well-known configuration, and the intake valve has an operation characteristic shown by a solid line L1 in FIG. 2 as a center and is driven in the phase from the most delayed phase shown by an alternate long and short dash line L2 to the most advanced phase shown by a dashed line L3 in accordance with the change of the operation phase of the cam for the intake valve. The exhaust valve has the operation characteristic shown by a sold line L4 in FIG. 2 as a center and is driven in the phase from the most advanced phase shown by an alternate long and short dash line L5 to the most delayed phase shown by a dashed line L6 in accordance with the change of the operation phase of the cam for the exhaust valve. An intake valve operation phase CAIN has the most delayed phase as a reference "0" and is defined such that the intake valve operation phase increases with an advance in phase. An exhaust valve operation phase CAEX has the most advanced phase as a reference "0" and is defined such that the exhaust valve operation phase increases with a delay in phase. The intake valve operation phase CAIN and the exhaust valve operation phase CAEX can be detected from a relative relationship between the output pulse of the cam angle sensor 27 which detects the rotation angle of corresponding cam shaft and the output pulse of the crank angle sensor 26.

Figure 3:
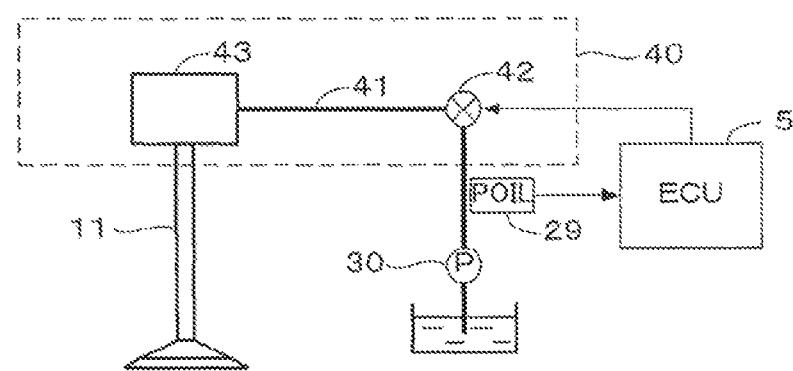
FIG. 3 is a schematic diagram for explaining the configuration of a cylinder deactivation mechanism.

FIG. 3 is a schematic diagram for explaining the configuration of a cylinder deactivation mechanism 40 (intake valve side). The cylinder deactivation mechanism 40 is provided with an oil passage 41 connected to an oil pump 30, an electromagnetic valve 42 located on the way of the oil passage 41, and a switching mechanism part 43 to which the hydraulic oil pressure is supplied through the oil passage 41. The valve closing condition of the electromagnetic valve 42 is an operating condition in which the intake valve 11 is driven by rotation of the cam. On the other hand, when the relatively high hydraulic oil pressure is supplied to the switching mechanism part 43 by opening the electromagnetic valve 42, a pin within the switching mechanism part 43 is moved and becomes a deactivation condition in which the intake valve 11 maintains the valve closing condition in spite of rotation of the cam. The oil pressure sensor 29 for detecting a hydraulic oil pressure POIL is provided in the oil passage 41, and the detection signal thereof is supplied to the ECU 5. The exhaust valve side of the cylinder deactivation mechanism 40 also is similarly configured.

The ECU 5 has a well-known configuration provided with a CPU, a memory, an input/output circuit and the like, and performs a fuel injection control by an injector 6, an ignition time control by an ignition plug 8, an intake air flow amount control by an actuator 3a and the throttle valve 3, a valve operation phase control by a valve operation phase variable mechanism 50, and the switching control between the partial cylinder operation and the whole cylinder operation by the cylinder deactivation mechanism 40 in accordance with the engine driving condition (mainly, engine rotational frequency NE and target torque TRQCMD). The target torque TRQCMD is mainly calculated in accordance with the accelerator pedal operation amount AP, and configured such that the target torque increases as the accelerator pedal operation amount AP increases. Further, a target intake air flow amount GAIRCMD is calculated in accordance with the target torque TRQCMD and configured so as to be substantially proportional to the target torque TRQCMD. An intake air flow amount control which drives throttle valve 3 by the actuator 3a is performed such that the actual intake air flow amount GAIR coincides with the target intake air flow amount GAIRCMD. Since an air amount which is inhaled per one ignition cycle into the combustion chamber of each cylinder by the intake air flow amount control increases or decreases in accordance with the increase or decrease of the intake air flow amount, it is also called an intake air flow amount control.

A fuel injection amount (mass) GINJ by the injector 6 is controlled by correcting a basic fuel amount GINJB calculated by using the intake air flow amount GAIR, by using a correction factor such as an air fuel ratio correction factor KAF and the like in accordance with an air fuel ratio AF detected by the air fuel ratio sensor. Herein, the fuel injection amount GINJ is converted by using a well-known method into a valve opening time TOUT of the injector 6 in accordance with a fuel pressure PF, a fuel density and the like and controlled in such a manner that the fuel amount supplied to the combustion chamber per one cycle becomes the fuel injection amount GINJ.

Figure 4:
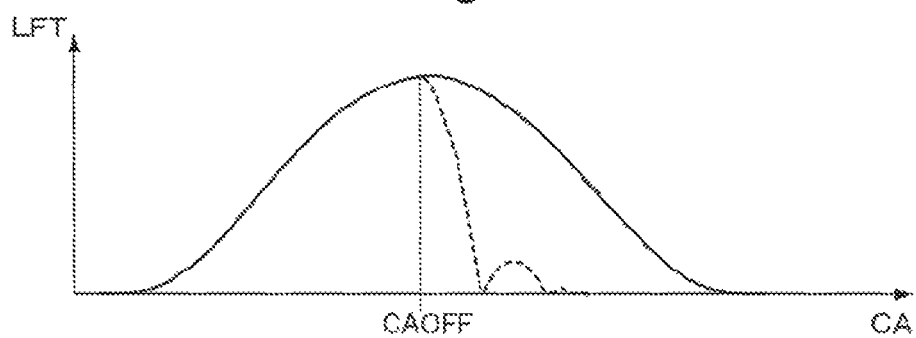
FIG. 4 is a view showing a lift curve of an intake valve for explaining abnormal noises (switching noises) generated at the time of performing the switching between whole cylinder operation and partial cylinder operation.

The abnormal noises (hereinafter, referred to as "switching noise") may be generated depending upon a relative relationship between a switching command time (valve opening command time CAOP of the electromagnetic valve 42), and, the intake valve operation phase CAIN and the exhaust valve operation phase CAEX when executing the switching between the whole cylinder operation and the partial cylinder operation. A solid line of FIG. 4 shows a lift curve at time of normal operation of the intake valve, and the dashed line is the crank angle CAOFF and shows a transition of a lift amount LFT at the time of having shifted to a deactivation condition. As shown in this drawing, the switching noises are inclined to be generated, when the lift amount LFT shifts to the deactivation condition in a state in which the lift amount LFT is relatively large. This is similarly applied to the exhaust valve.

FIGS. 5A-tD are each a time chart for explaining a relationship between the valve opening command time CAOP and a crank angle range RNS (hereinafter, referred to as "noise generation range RNS") apt to generate the switching noises. In FIGS. 5A-5D, the horizontal axis is the crank angle CA and the vertical axis is the lift amount LFT of the intake valve and exhaust valve. Since the switching noises are generated when the valve opening command time CAOP resides within the noise generation range RNS, an optimum valve opening command time CABST resides on the outside of the noise generation range RNS (hereinafter, referred to as "noise absence range RNN") and in a center position of a noise absence range RNN.

This drawing schematically shows the transition of the lift amounts of the intake valve and the exhaust valve of the cylinders #1~#3 which deactivates the operation during the partial cylinder operation. The solid line corresponds to the intake valve and the dashed line corresponds to the exhaust valve. To make the explanation plain, the maximum value of the lift amount of the intake valve is shown slightly larger than the maximum value of the lift amount of the exhaust valve. A time delay (hereinafter, referred to as "response delay time TDLY") resides until time (hereinafter, referred to as "actual shifting time CASW") actually shifting to the cylinder deactivation condition by the increase of the oil pressure within the switching mechanism part 43 from the valve opening command time CAOP, so that the noise generation range RNS becomes a relatively small angle range in the lift amount LFT.

FIG. 5A corresponds to a condition (hereinafter, referred to as "reference condition") where the intake valve operation phase CAIN and the exhaust valve operation phase CAEX are zero degrees each other. FIG. 5B corresponds to a condition of CAIN=50 degrees and CAEX=0 degrees, and FIG. 5C corresponds to a condition of CAIN=0 degrees and CAEX=50 degrees. FIG. 5D corresponds to a condition of CAIN=50 degrees and CAEX=50 degrees.

The zero degrees in the horizontal axis correspond to the optimum valve opening command time CABST in the reference condition shown in FIG. 5A. As shown in FIG. 5B, when only the intake valve operation phase CAIN advances, the optimum valve opening command time CABST is shifted to the advanced side. As shown in FIG. 5C, when only the exhaust valve operation phase CAEX is delayed, the optimum valve opening command time CABST is shifted to the delayed side. In the condition as shown in FIG. 5D, although the optimum valve opening command time CABST becomes zero degrees similarly to the reference condition, the noise absence range RNN becomes very narrow, and the possibility of the generation of the switching noises are increased by a slight lag of the valve opening command time CAOP.

As mentioned above, in order to make the valve opening command time CAOP coincide with the optimum valve opening command time CABST, the valve opening command time CAOP is required to change in accordance with the intake valve operation phase CAIN and the exhaust valve operation phase CAEX. In this embodiment, as mentioned later, when the execution condition of the partial cylinder operation was effected, a preparation control for suppressing the fluctuation of output torque of the engine 1 in the actual shifting time CASW is executed, and the valve opening command time CAOP is determined in accordance with the intake valve operation phase CAIN and the exhaust valve operation phase CAEX at the time (the time at which the intake valve operation phase CAIN and the exhaust valve operation phase CAEX are fixed) of completion of the preparation control. In that time, the response delay time TDLY is considered, and it is considered that the response delay time TDLY changes mainly depending upon the hydraulic oil pressure POIL.

FIGS. 6A-6F are each a time chart for explaining a transient control from the time in which the execution condition of the partial cylinder operation was effected to the time (CASW) which is actually shifted to the partial cylinder operation. FIGS. 6A-6F show the transition with respect to the throttle valve opening TH, the intake air flow amount GAIR, the ignition time IG, the intake valve operation phase CAIN, the exhaust valve operation phase CAEX, and a valve opening command flag FSOL of the electromagnetic valve 42, respectively. In the operation example shown in FIGS. 6A-6F, the target torque TRQCMD of the engine 1 is maintained at a constant value.

When the execution condition of the partial cylinder operation is effected in the time t0, the processing which calculates the switching time target throttle valve opening THTGT and a switching time target intake air flow amount GAIRTGT based on the target torque TRQCMD of the engine 1, as the target value at the time of execution of the switching from the whole cylinder operation to the partial cylinder operation, is executed, and the processing for decreasing the degree of engagement of a lock-up clutch of an automatic transmission (not shown) which is connected to the crankshaft of the engine 1, is executed.

The throttle valve opening TH is increased up to a switching time target throttle valve opening THTGT in the time t1. Consequently, since the intake air flow amount GAIR begin to gradually increase, the ignition time delay angle control for delaying the ignition time IG and the valve operation phase control which allows the intake valve operation phase CAIN and the exhaust valve operation phase CAEX to be shifted in accordance with a parameter (for example, any one of intake air flow amount GAIR, target torque TRQCMD, or charging efficiency ηc) showing a load of the engine and the engine rotational frequency NE by corresponding to the increase of the intake air flow amount GAIR in order to maintain the engine output torque TRQ so as to be the target torque TRQCMD are executed cooperatively. In the operation example shown in this drawing, the valve operation phase control in which the intake valve operation phase CAIN and the exhaust valve operation phase CAEX each increase is executed.

In the time t2, the intake air flow amount GAIR reaches the switching time target intake air flow amount GAIRTGT, and the preparation control for suppressing the fluctuation of output torque at the time of executing the switching operation is completed, so that the optimum valve opening command time CABST is calculated. After that, the operation has to wait until the time t3 in which the rotation phase of the engine 1 coincides with the optimum valve opening command time CABST. In the time t3 which corresponds to the optimum valve opening command time CABST, the switching operation by the switching mechanism part 43 is executed in the time t4 (corresponding to an actual shifting time CASW) by performing the valve opening command of the electromagnetic valve 42, and is shifted to the partial cylinder operation. The period from the time t3 to the time t4 corresponds to the response delay time TDLY of the cylinder deactivation mechanism 40. After the time t4, the intake valve operation phase CAIN and the exhaust valve operation phase CAEX are promptly shifted to the operation phases suitable for the partial cylinder operation, and the ignition time IG is promptly shifted to the ignition time IGCS suitable for the partial cylinder operation.

The torque fluctuation in the actual shifting time CASW can be suppressed by executing the transient control like this, and the generation of the switching noises can be prevented.

FIGS. 7A-7F are each a time chart showing the operation example which shifts from the time t2 to the waiting condition similarly to the operation example shown in FIGS. 6A-6F, which slightly changes the throttle valve opening TH before the rotation phase of the engine 1 coincides with the optimum valve opening command time CABST, and in which the intake valve operation phase CAIN and the ignition time IG were changed accordingly. In this example, the recalculation of the optimum valve opening command time CABST is executed in the time t12, and the operation will have to wait until the time t13 in which the rotational phase of the engine 1 coincides with the optimum valve opening command time CABST. FIGS. 7A-7F show an example in which the optimum valve opening command time CABST is advanced from the initial optimum valve opening command time CABST in the recalculation result. The valve opening command of the electromagnetic valve 42 is performed in the time t13, and the switching operation is executed in the time t14 thereby to shift to the partial cylinder operation.

Like this, when the operation condition of the engine 1 has changed in the waiting condition of the time t2 in which the optimum valve opening command time CABST is calculated initially, the switching noises can be accurately prevented by performing the recalculation of the optimum valve opening command time CABST.

FIG. 8 is a flow chart of the processing for executing the above mentioned transient control. This processing is executed in every predetermined crank angle (for example, 30 degrees) by the ECU 5 from the time in which the execution condition of the partial cylinder operation was effected. All of the initial value of the flag used in this processing is set to "0".

In a step S11, whether or not a target value calculation completion flag FTGTE is "1" is determined. The answer is initially a denial (NO), and the switching time target opening THTGT and the switching time target intake air flow amount GAIRTGT are calculated by proceeding to a step S12. In a step S13, the target value calculation completion flag FTGTE is set to "1" and the processing proceeds to a step S14. Accordingly, the processing proceeds from the step S11 directly to the step S14.

In the step S14, whether or not an intake air flow amount reaching flag FGAIROK is "1" is determined. This answer is initially a denial (NO). Then, the processing proceeds to a step S15, and an intake air amount increase control for setting the throttle valve opening TH to the switching time target opening THTGT, the ignition time delay control for delaying the ignition time IG in accordance with the increase of the intake air flow amount GAIR, and a valve operation phase control for changing the intake valve operation phase CAIN and the exhaust valve operation phase CAEX are cooperatively executed, so that a torque maintaining control for maintaining the output torque TRQ of the engine 1 so as to be target torque TRQCMD is executed. In this embodiment, as shown in FIGS. 6D and 6E, the valve operation phase control for increasing the overlap period overlapping the valve opening periods of the intake valve and the exhaust valve in accordance with the increase of the intake air flow amount GAIR is executed.

In a step S16, whether or not the intake air flow amount GAIR reaches the switching time target intake air flow amount GAIRTGT is determined. While the answer is a denial (NO), the processing is ended immediately. Accordingly, the torque maintenance control is continued. When the answer of the step S16 becomes an affirmative (YES), an intake air flow amount reach flag FGAIROK is set to "1" (step S17) and the processing proceeds to a step S18. Therefore, after that, the step 18 is repeatedly executed by becoming the affirmative (YES) of the answer of the step S14. In the step S18, the switching command control processing shown in FIG. 9 is executed.

Figure 9:
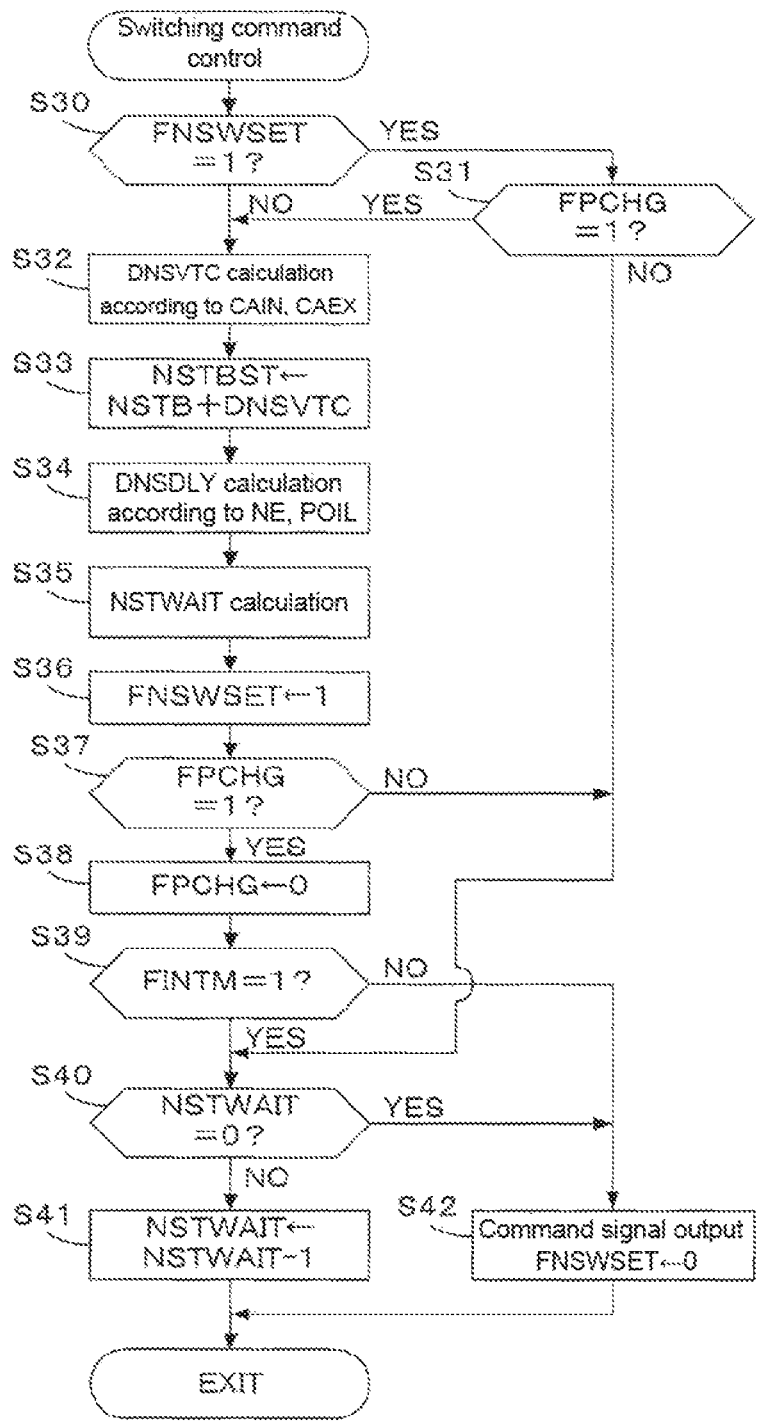
FIG. 9 is a flow chart of switching command control processing to be executed in the processing of FIG. 8.

FIG. 9 is a flow chart of the switching command control processing to be executed in the step S18 of FIG. 8. In this embodiment, the control of the valve opening command time CAOP of the electromagnetic valve 42 is performed by using a stage number NST defining the crank angle 30 degrees as one stage. The stage number NST has "0" as a reference value. It counts up "1" per a crank angle 30 degrees to "23", and the next after "23" is a parameter returning to "0" again.

In a step S30, whether or not a waiting stage number setting flag FNSWSET is "1" is determined. This answer becomes a denial (NO) at first, and the pressing proceeds to a step S32. Then, an optimum switching time change amount DNSVTC is calculated in accordance with the intake valve operation phase CAIN and the exhaust valve operation phase CAEX. The optimum switching time change amount DNSVTC is a change amount from the optimum switching time in a reference condition (CAIN=CAEX=0). Specifically, the optimum switching time change amount DNSVTC is calculated by searching a DNSVTC map (not shown) prefixed in accordance with the intake valve operation phase CAIN and the exhaust valve operation phase CAEX. The optimum switching time change amount DNSVTC is defined by a stage number NST. In the DNSVTC map, as explained with reference to FIGS. 5A-5D, the change amount of the optimum switching change time is set from a point of view for preventing the generation of the switching noises, and it is set such that, for example, the optimum switching time change amount DNSVT decreases as the intake valve operation phase CAIN increases and the optimum switching time change amount DNSVTC increases as the exhaust valve operation phase CAEX increases.

In a step S33, the optimum switching time change amount DNSVTC is applied to the following formula (1), and the optimum switching stage number NSTBST is calculated.

$$NSTBEST=NSTB+DNSVTC \tag{1}$$

Herein, the NSTB is the optimum switching stage number corresponding to the optimum switching time in the reference condition and is previously fixed.

Figure 10:
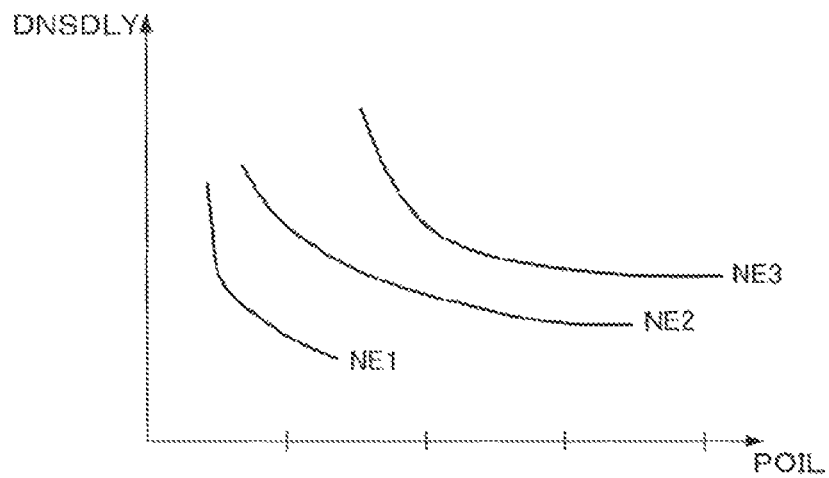
FIG. 10 is a view showing a map to be referred to in the processing of FIG. 9.

In a step 34, the DNSDLY map shown in FIG. 10 is searched in accordance with the engine rotational frequency NE and the hydraulic oil pressure POIL, and the delay stage number DNSDLY corresponding to the response delay time TDLY of the cylinder deactivation mechanism 40 is calculated. The predetermined engine rotational frequencies NE1, NE2 and NE3 shown in FIG. 10 satisfy the relationship of NE1<NE2<NE3. Accordingly, the DNSDLY map is set such that the delay stage number DNSDLY increases as the engine rotational frequency NE increases, and such that the delay stage number DNSDLY decreases as the hydraulic oil pressure POIL increases.

Figure 11:
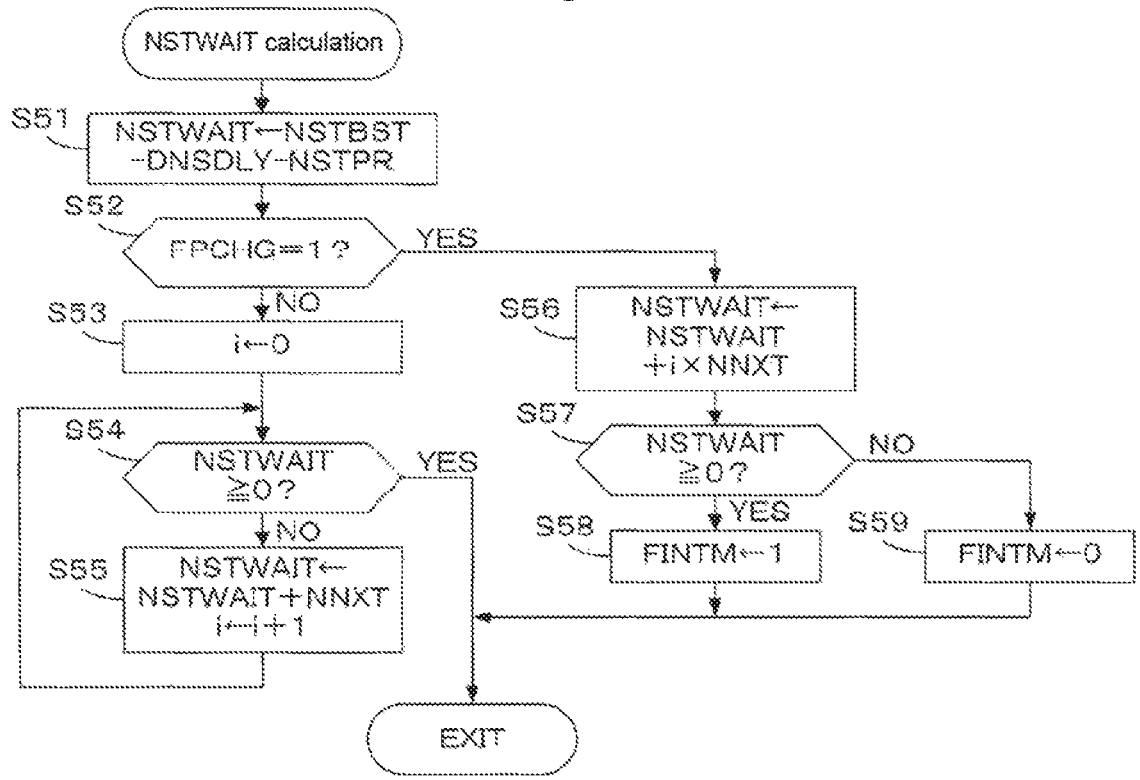
FIG. 11 is a flow chart of NSTWAIT calculation processing to be executed in the processing of FIG. 9.

In a step S35, the NSTWAIT calculation processing shown in FIG. 11 is executed, and the waiting stage number NSTWAIT until the stage outputting the valve opening command signal of the electromagnetic valve 42 is calculated.

In a step S51 of FIG. 11, the optimum switching stage number NSTBST and the delay stage number DNSDLY are applied to the following formula (2), and the waiting stage number NSTWAIT is calculated.

$$NSTWAIT=NSTBST-DNSDLY-NSTPR \quad (2)$$

Herein, the NSTPR is the stage number in which this time calculation processing is performed.

In a step S52, whether or not a parameter change flag FPCHG is "1" is determined. The parameter change flag FPCHG is set to "1" when at least one of the intake valve operation phase CAIN, the exhaust valve operation phase CAEX, the hydraulic oil pressure POIL and the engine rotational frequency NE which are a parameter having an influence on the waiting stage number NSTWAIT changes not less than the prefixed predetermined change amount in a condition where a waiting stage number set flag FNSW-SET is "1".

The answer of the step 52 becomes the denial (NO) in the step S52 at first. The processing proceeds to a step S53, and the value of an index parameter i is set to "0". In a step S54, whether or not the waiting stage number NSTWAIT is not less than "0" is determined. As mentioned above, since the stage number NST is the parameter of the value from "0" to "23", there is a possibility that the waiting stage number NSTWAIT calculated by the formula (2) becomes the negative value. Accordingly, when the answer of the step S54 is the denial (NO), the predetermined number NNXT is added to the waiting stage number NSTWAIT, the processing (step S55) for increasing the index parameter i by "1" is repeated until the answer of the step S54 becomes the affirmative (YES). The predetermined number NNXT is set to the stage number (for example, "8") up to the next switching command time suitable from a point of view for preventing the switching noises. When the answer of the step S54 is the affirmative (YES), the processing is ended. The value of the index parameter i shows an execution number of a step S55.

When the parameter change flag FPCHG is set to "1", the answer of the step S52 becomes the affirmative (YES), and the processing proceeds to a step S56. The waiting stage number NSTWAIT is renewed by applying the index parameter i to the following formula (3). Herein, in the case where the index parameter i is "0" at the time of the initial calculation execution, the waiting stage number NSTWAIT does not change even if the calculation of the formula (3) is performed.

$$NSTWAIT=NSTWAIT+i \times NNTX \quad (3)$$

In a step S57, whether or not the renewed waiting stage number NSTWAIT is not less than "0" is determined. When the answer is the affirmative (YES), the switching operation can be executed at the recalculated optimum switching stage number NSTBST. An in time flag FINTM showing that matter is set to "1" (step S58). When the answer of the step S57 is the denial (NO), and when the switching operation cannot be executed at the optimum switching stage number NSTBST even if the valve opening command signal of the electromagnetic valve 42 is outputted immediately, the in time flag FINTM is set to "0" (step S59).

Referring again to FIG. 9, in a step S36, the waiting stage number set flag FNSWSET is set to "1". In a step S37, whether or not the parameter change flag FPCHG is "1" is determined. The answer of the step S37 becomes the denial (NO) at first, and the proceeding proceeds to a step S40 immediately. In the step S40, whether or not the waiting stage number NSTWAIT is "0" is determined. When this answer is the denial (NO), the processing proceeds to a step S43, and the waiting stage number NSTWAIT is decreased by "1". When the answer of the step S40 is the affirmative (YES), the valve opening command signal (switching command signal) of the electromagnetic valve 42 is outputted, and the waiting stage number set flag FNSWSET is returned to "0" (step S42).

After execution of the step S36, the answer of the step S30 becomes the affirmative (YES). The processing proceeds to the step S31, and whether or not the parameter change flag FPCHG is "1" is determined. When this answer is the denial (NO), the processing proceeds to the step S40. Accordingly, the waiting stage number NSTWAIT decreases "1" by "1" as far as the parameter change flag FPCHG does not become "1". When the answer of the step S40 became the affirmative (YES), the processing proceeds to the step S42, and the valve opening command signal is outputted.

On the other hand, when the parameter change flag FPCHG is set to "1" in the waiting condition performing the subtraction of the waiting stage number NSTWAIT, the processing proceeds from the step S31 to the step S32, the recalculation of the optimum switching change amount DNSVTC, the optimum switching stage number NSTBST, and the waiting stage number NSTWAIT is executed. Since the answer of the step S37 becomes the affirmative (YES) at this time, the processing proceeds to the step S38, and the parameter change flag FPCHG returns to "0". Then, whether or not the in time flag FINTM set in the processing of FIG. 11 is "1" is determined (step S39). When the answer is the affirmative (YES), the processing proceeds to the step S40.

When the answer of the step S39 is the denial (NO), namely, the switching operation is not executed at the recalculated optimum switching stage number NSTBST even if the valve opening command signal is outputted immediately, the processing proceeds to the step S42 immediately in order that the shift to the partial cylinder operation is not delayed from a point of view of the preference of the fuel consumption, although there is a possibility that the switching noises are generated.

FIGS. 12 and 13 are the time charts for explaining the processing of FIG. 9. In these drawings, CA0 and CA10 are initial calculation times of the waiting stage number NST-WAIT, and CA1 and CA11 correspond to a recalculation time in which the recalculation is executed.

FIG. 12A corresponds to an example in which the parameter change flag FPCHG is maintained so as to be "0" in the waiting condition (corresponding to the operation example shown in FIGS. 6A-6F). In this example, the valve opening command signal is outputted in the time CA2 after elapse of the initial waiting stage number NSTWAIT0 from the calculation time CA0, and the actual switching (shifting to the partial cylinder operation) is performed in the time CA3 after the elapse of the delay stage number DNSDLY0 from that time. The time CA3 is the timing positioned in substantially a center of the OK range ROK in which the switching noises are not generated, so that the generation of the switching noises can be accurately prevented.

FIG. 12 (*b*) corresponds to an example in which the parameter change flag FPCHG is set to "1" in the time CA1 and in which the recalculation is executed (corresponding to the operation example shown in FIGS. 7A-7F). The valve opening command signal is outputted in the time CA4 after the elapse of the waiting stage number NSTWAIT1 (>0) recalculated from the recalculation time CA1, and the actual switching is performed in the time CA5 after the elapse of the delay stage number DNSDLY1 from that time. The time CA5 is the timing positioned in substantially a center of the OK range ROK in which the switching noises are not generated, so that the generation of the switching noises are accurately prevented even if the optimum valve opening command time is moved earlier by the recalculation (even if the waiting stage number NSTWAIT decreases).

FIG. 13A, similarly to FIG. 12A, corresponds to an example in which the valve opening command signal is outputted in the time CA12 of the elapse of the initial waiting stage number NSTWAIT2 from the calculation time CA10 and in which the actual switching is performed in the time CA13 after the elapse of the delay stage number DNSDLY2 from that time. FIG. 13B corresponds to an example in which the recalculated waiting stage number NSTWAIT becomes the negative value, so that the valve opening command signal is outputted immediately (immediately after the time CA11), and in which the actual switching is performed in the time CA15 after the elapse of the delay stage number DNSDLY3 from that time. In the example as shown in FIG. 13B, the actual switching is performed within the OK range ROK but in the time CA15 delayed from its center. The time CA14 shown in FIG. 13B corresponds to the optimum switching time.

As mentioned above, in this embodiment, in the case where having made the switching request from the whole cylinder operation to the partial cylinder operation, the preparation control for suppressing the fluctuation of the output torque of the engine 1 at the time of executing the switching operation from the whole cylinder operation to the partial cylinder operation is executed, and the optimum switching stage number NSTBST corresponding to the target switching time executing the switching operation is calculated after the preparation control is completed, in accordance with the intake valve operation phase CAIN and the exhaust valve operation phase CAEX. Then, the switching command signal (the valve opening command signal of the electromagnetic valve 42) to the cylinder deactivation mechanism 40 is outputted based on the calculated optimum switching stage number NSTBST. In the case where the switching noises are generated depending upon the timing executing the switching operation, it is confirmed that the timing which is difficult to generate the switching noises changes depending upon the valve operation phases of the intake valve and the exhaust valve. Accordingly, the optimum switching stage number NSTBST is calculated so as to become the timing (the optimum switching time) in which the switching noises are difficult to be generated, in accordance with the valve operation phases, and the valve opening command signal is outputted based on the optimum switching stage number NSTBST. Therefore, the generation of the switching noises can be prevented.

Further, since the waiting stage number NSTWAIT corresponding to the command signal output time is calculated in accordance with the delay stage number DNSDLY corresponding to the response delay time TDLY of the cylinder deactivation mechanism 40 in such a manner that the switching operation is executed at the optimum switching stage number NSTBST, the timing at which the actual switching operation is executed is allowed to coincide accurately with the optimum switching stage number NSTBST, so that the generation of the switching noises can be prevented accurately.

Further, when at least one of the intake valve operation phase CAIN, the exhaust valve operation phase CAEX, the engine rotational frequency NE and the hydraulic oil pressure POIL which are the operation parameter exerting an influence on the output time of the valve opening command signal has changed not less than the predetermined change amount after the calculation of the optimum switching stage number NSTBST and before the output of the valve opening command signal, namely, during the waiting time performing a count-down of the waiting stage number NSTWAIT, the recalculation of the waiting stage number NSTWAIT is performed. Therefore, the waiting stage number NSTWAIT is changed by corresponding to the change of the operation parameter, and the generation of the switching noises can be prevented.

Further, in the case where there is a high possibility that the actual switching operation cannot be executed at the recalculated optimum switching stage number NSTBST even if the waiting stage number NSTWAIT recalculated in the step 56 of FIG. 11 becomes the negative value and the valve opening command signal is outputted immediately after the execution of the recalculation (in the case where the answer of the step S39 becomes the affirmative (YES)), the valve opening command signal is outputted immediately after the execution of the recalculation. Therefore, the switching operation to the partial cylinder operation can be performed in its early stages even if there is a possibility that the switching noises are generated, and the fuel consumption can be improved.

Further, the delay stage number DNSDLY is determined in accordance with the hydraulic oil pressure POIL supplied to the switching mechanism part 43 of the cylinder deactivation mechanism 40 and the engine rotational frequency NE. It is confirmed that the response delay time TDLY of the cylinder deactivation mechanism 40 changes depending upon the hydraulic oil pressure POIL, and further, the switching command time is required to be determined by the rotation phase (crank angle) of the engine 1. Therefore, the actual switching operation execution time can be allowed to coincide accurately with the optimum switching time by determining the delay stage number DNSDLY in accordance with the hydraulic oil pressure POIL and the engine rotational frequency NE.

In this embodiment, for example, the steps S12 and S15 of FIG. 8 correspond to step a of claim 1, and the steps S32 and S33 of FIG. 9 correspond to a step b of claim 1. Then, the step S34~S42 of FIG. 9 correspond to a step c of claims 1 and 2, and the processing executing until the step S39 by shifting from the step S31 to the step S32 corresponds to a step d of claim 3.

Modified Embodiment

Figure 14:
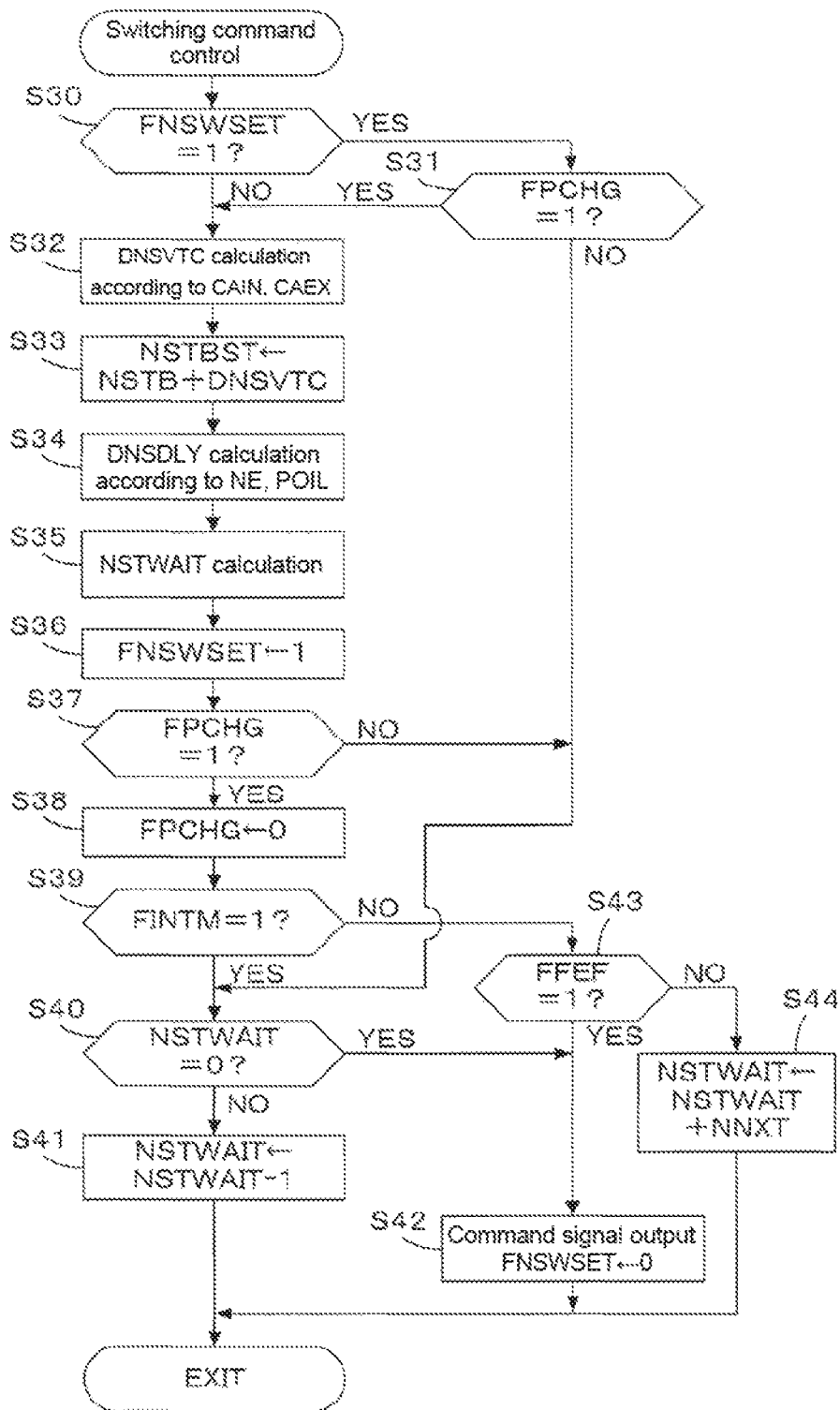
FIG. 14 is a flow chart showing a modified example of the processing of FIG. 9.

The switching command control processing shown in FIG. 9 may be replaced with the processing shown in FIG. 14. The processing shown in FIG. 14 is the processing that steps S43 and S44 are added to the processing of FIG. 9

After the recalculation of the waiting stage number NSTWAIT, when the answer of the step S39 is the denial (NO), the processing proceeds to the step S43, and whether or not a fuel consumption preference flag FFEF is "1" is determined. The fuel consumption preference flag FFEF is a flag which is set to "1" in the case of having preference with respect to the early shift to the partial cylinder operation over the prevention of the switching noises, and, for example, it is set in accordance with the operation mode (the fuel consumption preference mode or the quietness preference mode) of the vehicle driven by the engine 1.

When the answer of the step S43 is the affirmative (YES), the processing proceeds to the step S42, and the valve opening command signal is outputted immediately. On the other hand, when the answer of the step S43 is the denial (NO) and when the prevention of the generation of the switching noises has preference, the processing proceeds to the step S44, and the waiting stage number NSTWAIT is increased by the predetermined number NNXT. In other words, in the case of not meeting the closest optimum switching time from a point of view of the switching noise prevention, the switching execution time is delayed until the next optimum switching time, so that the generation of the switching noises is prevented accurately.

Figures 15A, 15B:
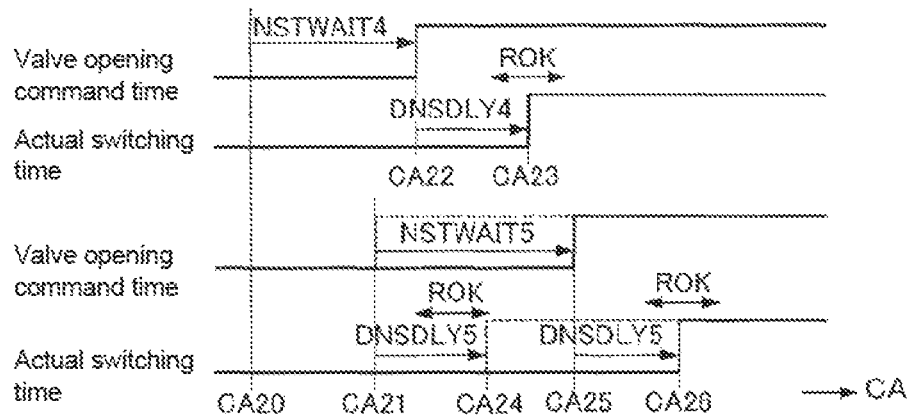
FIGS. 15A and 15B are each a time chart for explaining the processing of FIG. 14.

FIGS. 15A and 15B are each a time chart for explaining the processing of FIG. 14 and corresponds to an example in which the fuel consumption preference flag FFEF is set to "0". FIG. 15A, similarly to FIG. 13A, corresponds to the case where the recalculation is not performed, and the valve opening command signal is outputted in the time CA22 after the elapse of the waiting stage number NSTWAIT4 calculated in the time CA20. Then, the actual switching is performed in the time CA23 after the elapse of the delay stage number DNSDLY4 from that time.

FIG. 15B corresponds to the case where the recalculation is executed. The waiting stage number NSTWAIT recalculated in the time CA21 becomes the negative value, and the valve opening command signal is outputted in the time CA25 after the elapse of the waiting stage number NST-WAIT5 to which the predetermined number NNXT has been added. Then, the actual switching is performed in the time CA26 after elapse of the delay stage number NSTDLY5 from that time. Herein, the time CA 24 shows the actual switching time when the valve opening command signal is outputted immediately after the recalculation.

According to this modified embodiment, when the waiting stage number NSTWAIT after the recalculation became the negative value, the output time of the valve opening command signal can change in accordance with whether to take preference of the fuel consumption or whether to take preference of the suppression of the switching noises.

Further, the present invention is not limited to the above mentioned embodiments, and various modifications may be made. For example, the present invention may be applied to the case where the valve operation phase variable mechanism 50 changes the operation phase with respect to only the intake valve or the exhaust valve. Further, in the above embodiments, although there is shown the internal combustion engine of 6 cylinders in which the 3 cylinders per a partial cylinder operation are operated, the present invention is not limited to the internal combustion engine of 6 cylinders and may be applied to the case of executing the partial cylinder operation in which only a part of cylinders in the internal combustion engine having the plurality of cylinders is operated.

Further, in the above mentioned embodiments, although the engine 1 is not provided with an exhaust gas recirculation mechanism, the present invention may be applied to the control method of the internal combustion engine which is provided with the exhaust gas recirculation mechanism.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A control method of an internal combustion engine which comprises a plurality of cylinders, a valve operation phase variable mechanism configured to change a valve operation phase of at least one of an intake valve and an exhaust valve provided in each of the plurality of cylinders, and a cylinder deactivation mechanism configured to perform switching between partial cylinder operation in which a part of the plural cylinders is operated and whole cylinder operation in which all of the cylinders are operated, comprising steps of:
(a) executing, by a computer, a preparation control for suppressing fluctuation of an output torque of the engine at the time of executing switching operation from the whole cylinder operation to the partial cylinder operation when a switching request from the whole cylinder operation to the partial cylinder operation is made;
(b) calculating, by a computer, target switching time executing the switching operation after the preparation control is completed in accordance with the valve operation phase; and
(c) outputting, by a computer, switching command signal to the cylinder deactivation mechanism based on the target switching time to execute the switching operation.

2. The control method of the internal combustion engine according to claim 1, wherein, in the step (c), a command signal output time being an output time of the switching command signal is calculated in accordance with a operation delay time of the cylinder deactivation mechanism in such a manner that the switching operation is executed at the target switching time.

3. The control method of the internal combustion engine according to claim 2, further comprising a step (d) of performing recalculation of the target switching time and the command signal output time, when an operation parameter exerting the influence on the command signal output time is changed before outputting the switching command signal after calculation of the target switching time in the step (b).

4. The control method of the internal combustion engine according to claim 3, wherein the switching command signal is outputted immediately after performing the recalculation even in the case where there is a high possibility that the actual switching operation is not executed at the recalculated target switching time even if the switching command signal is outputted immediately after execution of the recalculation.

5. The control method of the internal combustion engine according to claim 2, wherein the cylinder deactivation mechanism is provided with a switching mechanism for switching between an operation condition and a deactivation condition of the intake valve and the exhaust valve of the cylinder to be deactivated in the partial cylinder operation, and the switching operation is executed by changing hydraulic oil pressure supplied to the switching mechanism, and wherein the command signal output time is calculated in accordance with rotational frequency of the engine and the hydraulic oil pressure.

6. The control method of the internal combustion engine according to claim 1, wherein the valve operation phase includes a switching crank angle range, and the target switching time is set within the switching crank angle range.

7. The control method of the internal combustion engine according to claim 6, wherein the switching crank angle range is a range in which a switching noise generated by the switching operation from the whole cylinder operation to the partial cylinder operation is suppressed.

8. The control method of the internal combustion engine according to claim 6, wherein the switching crank angle range is advanced or delayed depending on the change of the valve operation phase.

9. The control method of the internal combustion engine according to claim 3, wherein the operation parameter exerting the influence on the command signal output time is an operation parameter of the engine.

10. A non-transitory computer-readable medium that stores therein a program causing a computer to execute a control process of an internal combustion engine which comprises a plurality of cylinders, a valve operation phase variable mechanism configured to change a valve operation phase of at least one of an intake valve and an exhaust valve provided in each of the plurality of cylinders, and a cylinder deactivation mechanism configured to perform switching between partial cylinder operation in which a part of the plural cylinders is operated and whole cylinder operation in which all of the cylinders are operated, the process comprising:
  (a) executing a preparation control for suppressing fluctuation of an output torque of the engine at the time of executing switching operation from the whole cylinder operation to the partial cylinder operation when a switching request from the whole cylinder operation to the partial cylinder operation is made;
  (b) calculating target switching time executing the switching operation after the preparation control is completed in accordance with the valve operation phase; and
  (c) outputting switching command signal to the cylinder deactivation mechanism based on the target switching time to execute the switching operation.

* * * * *